(12) United States Patent
Lang

(10) Patent No.: US 8,429,135 B1
(45) Date of Patent: Apr. 23, 2013

(54) PROCESSOR FAULT TOLERANCE THROUGH TRANSLATION LOOKASIDE BUFFER REFRESH

(75) Inventor: Steven M. Lang, Cary, NC (US)

(73) Assignee: Cisco Technology, Inc., San Jose, CA (US)

( * ) Notice: Subject to any disclaimer, the term of this patent is extended or adjusted under 35 U.S.C. 154(b) by 493 days.

(21) Appl. No.: 12/482,641

(22) Filed: Jun. 11, 2009

(51) Int. Cl.
G06F 7/00 (2006.01)
G06F 17/00 (2006.01)

(52) U.S. Cl.
USPC .......................................................... 707/687

(58) Field of Classification Search ............... 707/687
See application file for complete search history.

(56) References Cited

U.S. PATENT DOCUMENTS

| 4,953,164 A * | 8/1990 | Asakura et al. ............ 714/754 |
| 5,627,992 A * | 5/1997 | Baror ....................... 711/133 |
| 7,263,631 B2 | 8/2007 | VanBuren |
| 2004/0193992 A1* | 9/2004 | Jamil et al. ............... 714/742 |
| 2005/0154865 A1* | 7/2005 | Steely et al. .............. 712/228 |

OTHER PUBLICATIONS

Wang et al., "ReStore: Symptom Based Soft Error Detection in Microprocessors", Jul. 2006, Univ. of Illinois at Urbana-Champaign.*

* cited by examiner

Primary Examiner — James Trujillo
Assistant Examiner — Jeffrey Chang
(74) Attorney, Agent, or Firm — Edell, Shapiro & Finnan, LLC

(57) ABSTRACT

Techniques are provided herein to provide a processor device that has tolerance for faults associated with operations of a translation lookaside buffer. In a processor device, contents of a translation lookaside buffer are stored in a memory that is protected by an error correction code (ECC) to provide an ECC-protected backup copy of the contents of the translation lookaside buffer. When a miss exception of the translation lookaside buffer is triggered during execution of a processor function, the contents of the translation lookaside buffer is refreshed with the ECC-protected backup copy. Future operations of the processor are made using the refreshed contents of the translation lookaside buffer.

19 Claims, 4 Drawing Sheets

PROCESSOR FAULT TOLERANCE THROUGH TRANSLATION LOOKASIDE BUFFER REFRESH

TECHNICAL FIELD

The present disclosure relates to processor devices and systems, and more particularly to improving the reliability of such devices and systems in which processor devices are deployed when exposed to radiation.

BACKGROUND

A single event upset (SEU) occurs in an electronic circuit device, such as a digital circuit, when the device is exposed to energetic ions and protons. This is a particular concern for circuit devices that are to be deployed for operation in space, such as Earth orbit.

In harsh environments, such as space, where digital circuits are exposed to radiation, many processors may be prone to single event functional interrupts (SEFIs). A SEFI impairs the normal operation of the host device and requires a reboot or power cycle. Further evaluations have shown that that a significant portion of those SEFIs take the form of TLB miss exceptions.

In processor devices, a translation lookaside buffer (TLB) is a hardware component that is provided to improve the speed of virtual to physical address translations. A TLB comprises an array of entries that maps a virtual address region to a corresponding physical address region. If a single bit erroneously changes within the TLB array, the system will likely fail when the corrupt entry is accessed and an improper address translation is triggered.

A TLB miss exception is triggered when a processor attempts a translation of a virtual address to a physical address using a translation lookaside buffer that does not contain an entry for the virtual address in question. A TLB miss exception can be caused by either looking up an invalid virtual address in a valid TLB array or by looking up a valid virtual address in an invalid TLB array.

DESCRIPTION OF EXAMPLE EMBODIMENTS

Overview

Techniques are provided herein to provide tolerance for faults associated with operations of a translation lookaside buffer in a processor device. In the processor device, contents of a translation lookaside buffer are stored in a memory that is protected by an error correction code (ECC) to provide an ECC-protected backup copy of the contents of the translation lookaside buffer. When a miss exception of the translation lookaside buffer is triggered during execution of a processor function, the content of the translation lookaside buffer is refreshed with the ECC-protected backup copy. Future operations of the processor are made using the refreshed content of the translation lookaside buffer.

Example Embodiments

Figure 1:
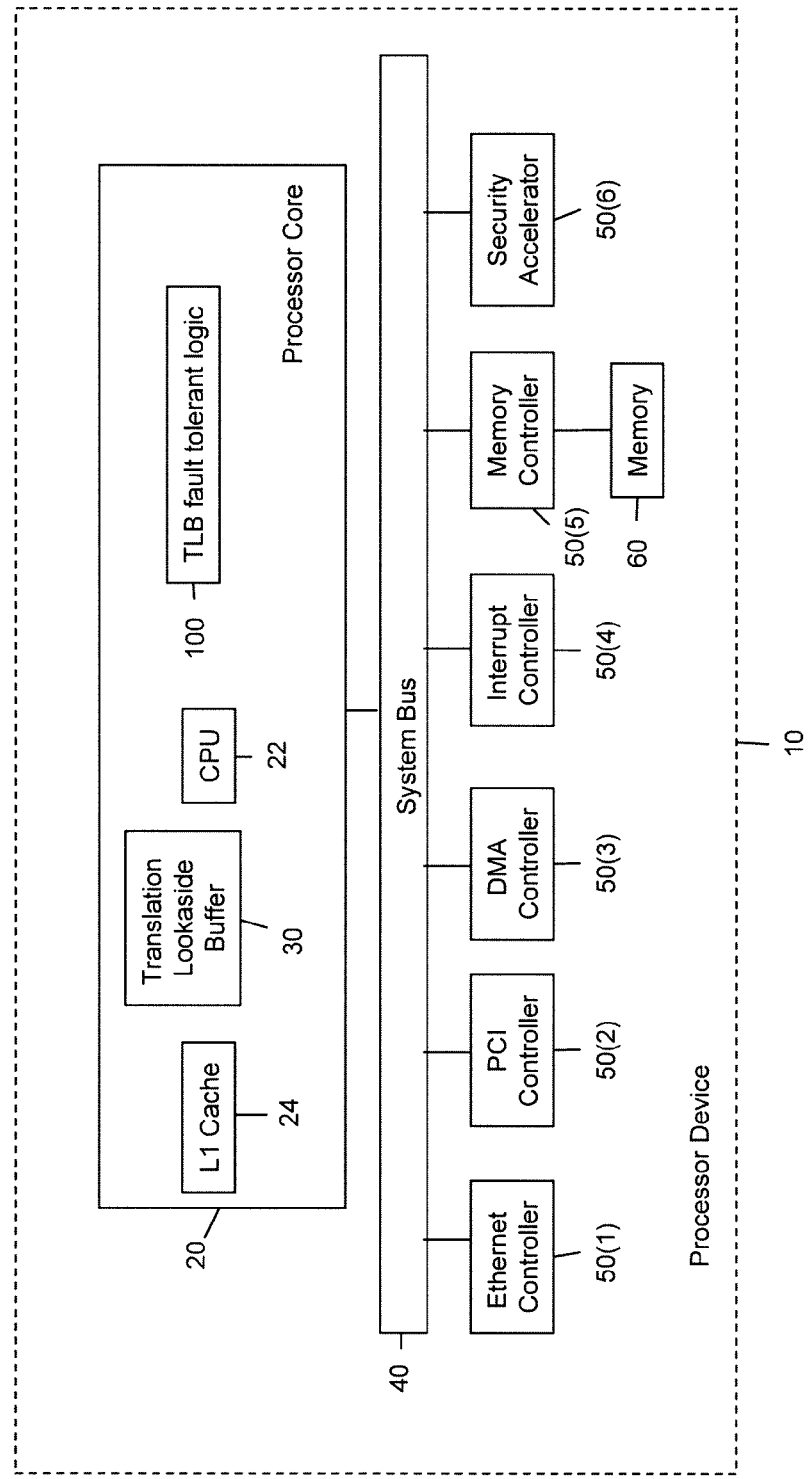
FIG. 1 is an example of a block diagram of a processor device that is configured with translation lookaside buffer (TLB) fault tolerant logic to improve the availability of the processor device in the event of TLB miss exceptions due to corrupted TLB contents.

Referring first to FIG. 1, a processor device is shown generally at reference numeral 10. The processor device 10 may be implemented in a single integrated circuit form, as a so-called system-on-chip (SOC), or in multiple separate integrated circuits. The techniques described herein apply to either form. FIG. 1 illustrates only examples of components of the processor device 10 that pertain to the techniques described herein. It should be understood that there are additional components that are not shown for the sake of simplicity. The processor device 10 may be a microprocessor, microcontroller, digital signal processor, etc.

The processor device 10 comprises a processor core 20 that contains the main processing components. For example, the processor core 20 comprises a central processing unit (CPU) 22 and a level 1 (L1) cache 24. A translation lookaside buffer (TLB) is provided in the processor 20 and may functionally reside between the CPU 22 and the L1 cache 24. The processor device also comprises a system bus 40.

The TLB 30 is a hardware component that is provided to improve the speed of virtual to physical address translations. The TLB 30 may comprise an array of entries that map a virtual address region to a corresponding physical address region. If a single bit erroneously changes within the TLB array, the host device in which the processor device 10 resides will likely fail when the corrupt entry is accessed and an improper translation is triggered. A single-bit error may occur when the processor device 10 is exposed to radiation, for example, when the host device in which the processor device 10 is deployed is in an environment such as space.

To this end, the processor device 10 is configured to provide a mechanism to reduce the likelihood of a corrupt entry in the TLB 30 caused by radiation exposure, for example. The TLB fault tolerant logic 100 is provided in the processor core 20, and the logic 100 is described in further detail hereinafter in conjunction with FIGS. 2-4.

There are numerous hardware components that perform functions for the processor device 10. Examples of additional hardware components are an Ethernet controller 50(1), a peripheral component interconnect (PCI) controller 50(2), a direct memory access (DMA) controller 50(3), an interrupt controller 50(5), a memory controller 50(5) and a security accelerator 50(6). These additional hardware components connect to the system bus 40 as does the processor core 20.

A memory 60 is also provided, and it may be internal or external to the processor device. The memory 60 may comprise one or more of a dynamic random access memory (DRAM), static RAM (SRAM), read only memory (ROM), flash memory, etc. The memory 60 is of the type that, when data is written to it for storage, it performs error correction coding (ECC) on the data so that the stored data is an ECC-protected copy of the original data. This enables error correction to be performed when reading the data from the memory 60, thereby increasing the likelihood of recovering the original data that was stored.

While the TLB fault tolerant logic 100 is shown in FIG. 1 as being part of the processor core 20, it should be understood that it may be implemented by software instructions stored in memory 60 (in any of the aforementioned listed or other forms of memory). Again, the memory 60 may be part of the processor device 10, i.e., integrated into the same circuit board or chip or chips, or may be external thereto.

The TLB fault tolerant logic 100 improves the fault tolerance of a processor by handling bit errors of the TLB 30. The TLB 30 may be static in that its contents are initialized upon startup or boot-up of the processor device 10. The TLB 30 may also be dynamic in that its contents may be modified from time-to-time during processor operations.

Figure 2:
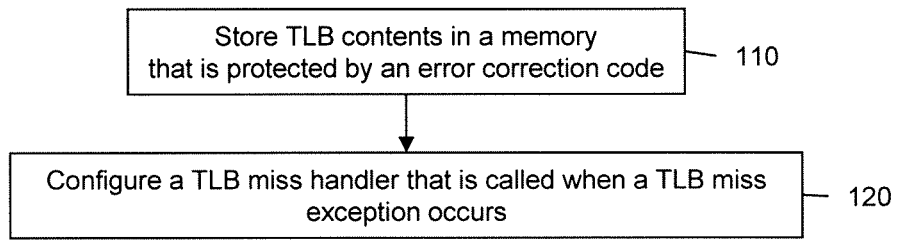
FIG. 2 is an example of a high level flow chart for tasks to be performed at system startup to initialize the TLB fault tolerant logic.

Turning now to FIG. 2, the TLB fault tolerant logic 100 is now described. At 110, the TLB contents is written to a memory or a region of a memory that is protected by an ECC for storage, and that is allocated for backup storage of the TLB content. As explained above, any type of memory that utilizes an ECC may be used for this purpose, including SRAM, DRAM, flash memory, etc. The TLB contents that are stored in the memory 60 are referred to herein as an ECC-protected backup copy of the contents of the TLB 30. When the TLB 30 is static, the backup storage function 110 is performed at startup or boot-up of the processor device 10 when the TLB 30 is initialized or filled. When the TLB 30 is dynamic, the backup storage function 110 is performed whenever contents of the TLB 30 is modified so that the ECC-protected backup contents reflects the most current version of the contents of the TLB 30 due to dynamic modifications thereto.

At 120, a TLB miss handler function is configured to be called when a TLB miss exception is triggered or occurs. The TLB miss handler function generally operates by refreshing contents of the translation lookaside buffer with the ECC-protected backup copy when a miss exception of the TLB is triggered during execution of a processor function.

Figure 3:
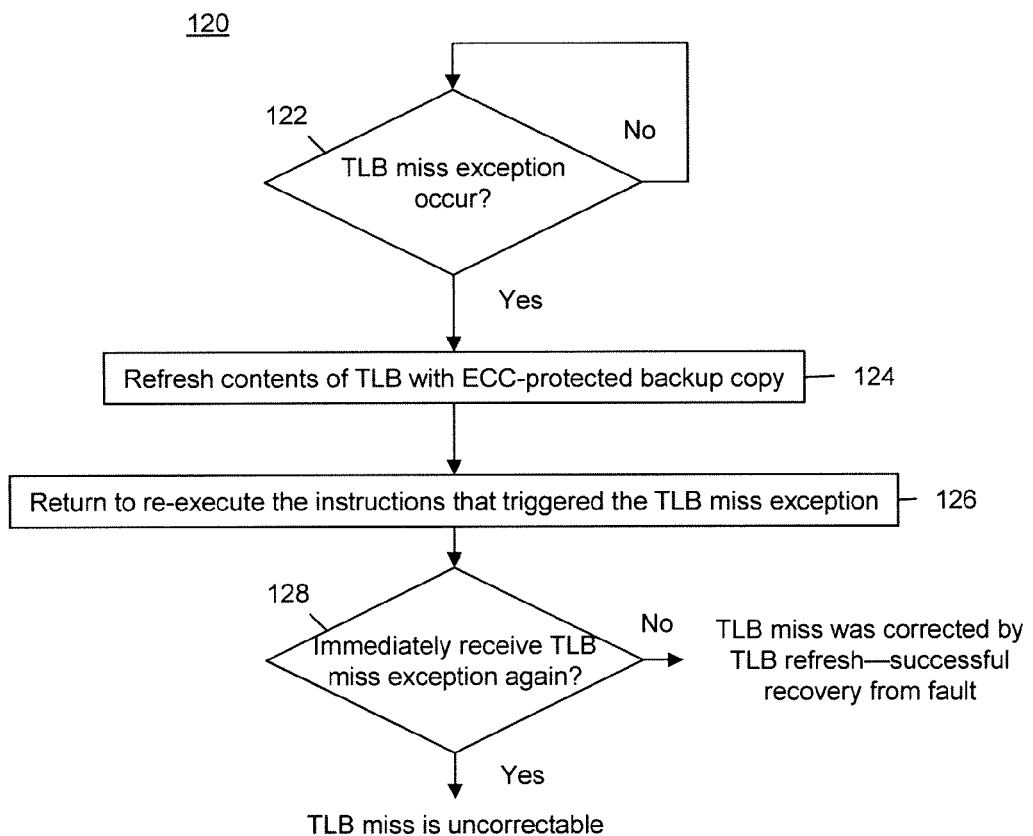
FIG. 3 is an example of a detailed flow chart for a TLB miss exception handling function forming a part of the TLB fault tolerant logic.

The TLB miss handler function 120 is now described with reference to FIG. 3. More specifically, at 122, a determination is made as to whether a TLB miss exception has occurred. A TLB miss exception trigger is generated when the processor core 20 determines that an address translation made using the TLB 30 returned an invalid address. If so, then at 124, the contents of the TLB 30 are refreshed with the ECC-protected backup copy retrieved from memory 60, so that the TLB 30 now contains the ECC-protected backup copy. If there were any single-bit errors in the TLB 30 caused, for example, by radiation, the ECC-protected backup copy would be free of such errors.

At 126, a return is made to re-execute the processor function that triggered the TLB miss exception, but using the ECC-protected backup copy written into the TLB 30 at 124. At 128, a determination is made as to whether a TLB miss exception is immediately triggered again after the TLB refresh is made. If a miss exception is triggered at 128, then the processor may store an indication or make a declaration indicating that the TLB miss is unrecoverable, i.e., that it is due to an uncorrectable problem in the TLB contents. In this case, the TLB miss was likely the result of an invalid address rather than an invalid TLB entry in the TLB 30 (caused by radiation exposure, for example). On the other hand, if at 128, it is determined that a TLB miss exception did not immediately occur again, then the processor stores an indication or makes a declaration indicating that the TLB miss was an error in the TLB contents that was successfully corrected by the TLB backup refresh, and thus the processor successfully recovered from the fault.

Example of pseudo-code for the TLB miss handler function 120 is as follows:

```
now = Capture start time
bad_addr = get address that triggered TLB miss exception
if ((last_time == now) && (last_bad_addr == bad_addr)) {
  /* Handle unrecoverable TLB miss */
} else {
  /* Attempt to recover */
  for (i=0; i<num_protected_tlb_entries; i++) {
    write TLB entry with protected copy from memory
  }
  last_bad_addr = bad_addr;
  last_time = now;
}
```

Figure 4:
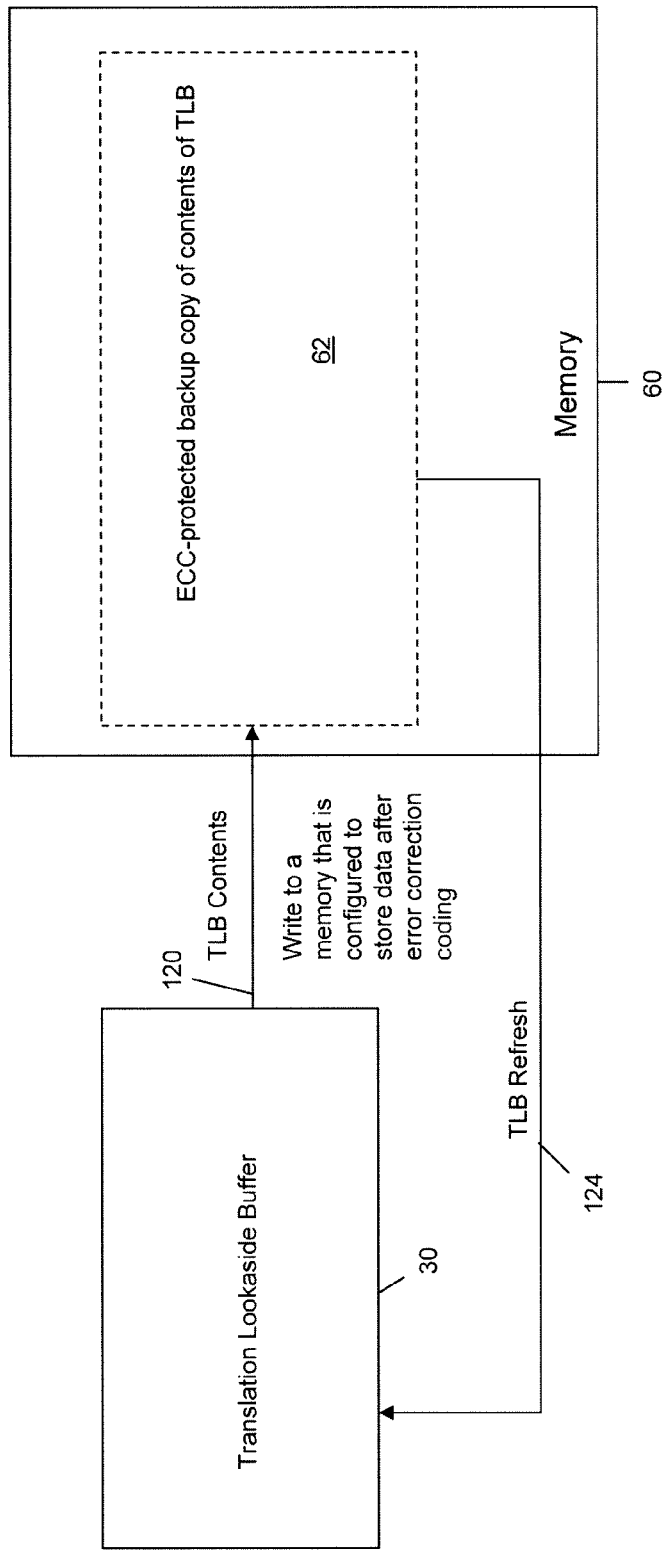
FIG. 4 is a block diagram showing how a backup copy of the contents of the TLB is stored in a memory and retrieved for use in the event of a TLB miss exception.

FIG. 4 is a diagram that depicts backup storage function 120 of the TLB contents and the refreshing function 124. This figure graphically shows the backup storage function 120 that involves writing the contents of the TLB 30 to a region of memory 60 that error correction encodes data when it is stored. Thus, the ECC-protected backup copy of the original contents of the TLB is shown at 62 in memory 60. This figure also graphically shows the refresh function 124 where the ECC-protected backup copy 62 in memory 60 is retrieved from memory 60 and written into the TLB 30.

The foregoing techniques are useful in any host device that uses a processor device, such as a computing device, wired or wireless communication device, network device such as a network router, etc.

The TLB fault tolerant logic 100 described herein may take any of a variety of forms, so as to be encoded in one or more tangible media for execution. For example, the logic may be in the form of software code instructions stored in memory (a memory in the processor core 20 or memory 60) and for execution by the processor core 20 to perform the functions described herein. In another example, the TLB fault tolerant logic 100 may be in the form of digital logic gates, a programmable gate array device or other programmable or fixed logic device, configured to perform the functions described herein.

To summarize, the fault tolerance of a processor may be improved by refreshing the contents of its TLB. A copy of the contents of the TLB array is stored in a region of memory protected by an error correction encoding techniques. This ECC-protected backup copy is then used when a TLB miss exception is triggered.

There are several advantages of this technique. First, the processor is more tolerant to faults that can occur during normal execution. This improved fault tolerance in turn increases the uptime of the host system or device as a whole. Second, these techniques can be applied to commercially available processors and do not require the development of custom hardware, such as an application specific integrated circuit, to improve the fault tolerance. Third, the algorithm is interrupt driven and as a result uses very little CPU cycles. It does not require a background task or the periodic execution of a task.

The techniques described herein are particularly useful in processor devices that are deployed in harsh environments such as those that are susceptible to single event upsets (SEUs) that occur at high altitudes or space environments. As silicon wafer technology continues to increase in density, it is expected that SEU effects will increasingly become an issue in non-space environments. For example, SEU effects have been observed even at sea-level in some digital devices. Thus, these techniques may be useful in any digital system controlled by a processor.

Although the apparatus, system, and method are illustrated and described herein as embodied in one or more specific examples, it is nevertheless not intended to be limited to the details shown, since various modifications and structural changes may be made therein without departing from the scope of the apparatus, system, and method and within the scope and range of equivalents of the claims. Accordingly, it is appropriate that the appended claims be construed broadly and in a manner consistent with the scope of the apparatus, system, and method, as set forth in the following claims.

What is claimed is:

1. A method comprising:
in a processor device that includes software instructions, storing contents of a translation lookaside buffer in a memory that is protected by an error correction code to provide an error correction code protected backup copy of the contents of the translation lookaside buffer;
setting a trigger for a miss exception for the contents of the translation lookaside buffer to determine whether an address translation of the contents of the translation lookaside buffer returns an invalid address;
determining whether a first instance of the trigger for the miss exception has occurred;
performing a translation lookaside buffer miss handler function when the first instance of the trigger for the miss exception has occurred in order to refresh the contents of the translation lookaside buffer with the error correction code protected backup copy such that the contents of the translation lookaside buffer comprise the error correction code protected backup copy of the contents of the translation lookaside buffer;
re-executing the translation lookaside buffer miss handler function using the error correction code protected backup copy in the translation lookaside buffer;
determining whether a second instance of the trigger for the miss exception has occurred;
storing an indication indicating that the address translation of the contents of the translation lookaside buffer is unrecoverable and returns the invalid address due to an uncorrectable problem in response to determining that the second instance of the trigger has occurred; and
storing an indication that the miss exception was an error and that the invalid address of the address translation of the contents of the translation lookaside buffer was successfully corrected by refreshing the contents with the error correction code protected backup copy in response to determining that the second instance of the trigger has not occurred.

2. The method of claim 1, wherein re-executing comprises determining whether the trigger for the miss exception has occurred after performing the translation lookaside buffer miss handler function.

3. The method of claim 2, and further comprising declaring a presence of an uncorrectable problem in the contents of the translation lookaside buffer when the miss exception trigger has been determined to occur after again performing the translation lookaside buffer miss handler function.

4. The method of claim 2, and further comprising declaring that one or more errors in the contents of the translation lookaside buffer were corrected when the miss exception trigger has been determined not to occur after performing the translation lookaside buffer miss handler function.

5. The method of claim 1, wherein for a static translation lookaside buffer, said storing is performed at startup of the processor device when the translation lookaside buffer is initialized.

6. The method of claim 1, wherein for a dynamic translation lookaside buffer, said storing is performed whenever contents of the translation lookaside buffer is modified.

7. The method of claim 3, and further comprising determining that the uncorrectable problem in the contents of the translation lookaside buffer is the result of a corrupted address rather than an invalid entry in the contents of the translation lookaside buffer.

8. An apparatus comprising:
a processor core in a processor device, the processor core comprising a translation lookaside buffer;
a memory that stores data protected by an error correction code and software instructions;
wherein the processor core is configured to:
store contents of the translation lookaside buffer in the memory so as to provide error correction code protected backup copy of the contents of the translation lookaside buffer,
set a trigger for a miss exception for the contents of the translation lookaside buffer to determine whether an address translation of the contents of the translation lookaside buffer returns an invalid address;
determine whether a first instance of the trigger for the miss exception has occurred;
perform a translation lookaside buffer miss handler function when the first instance of the trigger for the miss exception has occurred in order to refresh the contents of the translation lookaside buffer with the error correction code protected backup copy such that the contents of the translation lookaside buffer comprise the error correction code protected backup copy of the contents of the translation lookaside buffer;
re-execute the translation lookaside buffer miss handler function using the error correction code protected backup copy in the translation lookaside buffer;
determine whether a second instance of the trigger for the miss exception has occurred;
store an indication that the address translation of the contents of the translation lookaside buffer is unrecoverable and returns the invalid address due to an uncorrectable problem in response to determining that the second instance of the trigger has occurred; and
store an indication that the miss exception was an error and that the invalid address of the address translation of the contents of the translation lookaside buffer was successfully corrected by refreshing the contents with the error correction code protected backup copy in response to determining that the second instance of the trigger has not occurred.

9. The apparatus of claim 8, wherein the processor core is further configured to again determine whether the trigger for the miss exception has occurred after performing the translation lookaside buffer miss handler function.

10. The apparatus of claim 9, wherein the processor core is configured to declare a presence of an uncorrectable problem in the contents of the translation lookaside buffer when the miss exception trigger has been determined to again occur after the performed translation lookaside buffer miss handler function.

11. The apparatus of claim 9, wherein the processor core is configured to declare that one or more errors in the contents of the translation lookaside buffer were corrected when the miss exception trigger has been determined not to occur after the performed translation lookaside buffer miss handler function.

12. The apparatus of claim 10, wherein the processor core is configured to determine that the uncorrectable problem in the contents of the translation lookaside buffer is the result of a corrupted address rather than an invalid entry in the contents of the translation lookaside buffer.

13. Logic encoded in one or more tangible non-transitory media for execution and when executed operable to:
- store contents of a translation lookaside buffer in a memory that is protected by an error correction code to provide an error correction code protected backup copy of the contents of the translation lookaside buffer;
- set a trigger for a miss exception for the contents of the translation lookaside buffer to determine whether an address translation of the contents of the translation lookaside buffer returns an invalid address;
- determine whether a first instance of the trigger for the miss exception has occurred;
- perform a translation lookaside buffer miss handler function when the first instance of the trigger for the miss exception has occurred in order to refresh the contents of the translation lookaside buffer with the error correction code protected backup copy such that the contents of the translation lookaside buffer comprise the error correction code protected backup copy of the contents of the translation lookaside buffer;
- re-execute the translation lookaside buffer miss handler function using the error correction code protected backup copy in the translation lookaside buffer;
- determine whether a second instance of the trigger for the miss exception has occurred;
- store an indication indicating that the address translation of the contents of the translation lookaside buffer is unrecoverable and returns the invalid address due to an uncorrectable problem in response to determining that the second instance of the trigger has occurred; and
- store an indication that the miss exception was an error and that the invalid address of the address translation of the contents of the translation lookaside buffer was successfully corrected by refreshing the contents with the error correction code protected backup copy in response to determining that the second instance of the trigger has not occurred.

14. The logic of claim 13, and further comprising logic configured to again determine whether the trigger for the miss exception has occurred after performing the translation lookaside buffer miss handler function.

15. The logic of claim 14, and further comprising logic configured to declare that one or more errors in the contents of the translation lookaside buffer were corrected when the miss exception trigger has been determined not to occur after the performed the translation lookaside buffer miss handler function.

16. The logic of claim 14, and further comprising logic configured to declare a presence of an uncorrectable problem in the contents of the translation lookaside buffer when the miss exception trigger has been determined to occur again after the performed the translation lookaside buffer miss handler function.

17. The logic of claim 13, wherein for a static translation lookaside buffer, the logic that stores is configured to store the contents of the translation lookaside buffer at startup of the processor device when the translation lookaside buffer is initialized.

18. The logic of claim 13, wherein for a dynamic translation lookaside buffer, the logic that stores is configured to store the contents of the translation lookaside buffer whenever contents of the translation lookaside buffer is modified.

19. The logic of claim 16, and further comprising logic configured to determine that the uncorrectable problem in the contents of the translation lookaside buffer is the result of a corrupted address rather than an invalid entry in the contents of the translation lookaside buffer.

* * * * *